United States Patent [19]
Keith

[11] Patent Number: 5,364,117
[45] Date of Patent: Nov. 15, 1994

[54] METHOD AND APPARATUS FOR CONNECTING A TOW VEHICLE TO A TRAILER HAVING A FRONT AXLE ASSEMBLY WHICH PIVOTS ABOUT A VERTICLE AXIS

[76] Inventor: Peter G. Keith, 1059 Edgemont Road NW., Calgary, Alberta, Canada, T3A 2J5

[21] Appl. No.: 105,290
[22] Filed: Aug. 10, 1993
[51] Int. Cl.5 ............................................. B60D 1/173
[52] U.S. Cl. ................................... 280/459; 280/442; 280/444; 280/461.1
[58] Field of Search ............... 280/459, 460.1, 461.1, 280/442, 444, 456.1, 457, 408, 132

[56] References Cited

U.S. PATENT DOCUMENTS

| | | | |
|---|---|---|---|
| 2,092,683 | 4/1937 | Stidham | 280/443 |
| 2,450,215 | 9/1948 | Wilson | 280/443 |
| 2,498,779 | 2/1950 | Winchester | 280/405.1 |
| 2,523,211 | 9/1950 | Hedgpeth | 280/405.1 |
| 3,814,464 | 6/1974 | Wardill et al. | 280/455.1 |
| 4,262,920 | 4/1981 | Mett et al. | 280/461.1 |
| 4,402,523 | 9/1983 | Knowles | 280/446.1 |
| 4,451,058 | 5/1984 | Curry | 280/423.1 |
| 5,037,121 | 8/1991 | Gallatin | 280/461.1 |

FOREIGN PATENT DOCUMENTS

| | | | |
|---|---|---|---|
| 20065/83 | 4/1984 | Australia . | |
| 1289986 | 1/1991 | Canada . | |
| 66269 | 12/1982 | European Pat. Off. | 280/442 |
| 969695 | 12/1950 | France | 280/442 |
| 1468997 | 2/1967 | France | 280/442 |
| 843816 | 5/1952 | Germany | 280/442 |
| 893298 | 9/1953 | Germany | 280/442 |
| 2952405 | 7/1981 | Germany | 280/442 |
| 3030279 | 2/1982 | Germany | 280/442 |
| 106305 | 6/1984 | Japan | 280/442 |
| 143547 | 2/1931 | Switzerland . | |
| 0164709 | 10/1933 | Switzerland | 280/442 |
| 1049323 | 10/1983 | U.S.S.R. . | |

Primary Examiner—Mitchell J. Hill
Assistant Examiner—Kevin Hurley
Attorney, Agent, or Firm—Davis, Bujold & Streck

[57] ABSTRACT

A method of connecting a tow vehicle to a trailer having a front axle assembly which pivots about a vertical axis. The method includes the following steps which will be hereinafter described. Firstly, position a drawbar assembly between the tow vehicle and the trailer. The drawbar assembly has a tow vehicle end and a trailer end. The tow vehicle end is mounted to a single articulation point at a rear of the tow vehicle. The trailer end is pivotally mounted on a substantially horizontal transverse axis thereby accommodating up and down movement while precluding side to side movement of the drawbar assembly. Secondly, position a steering arm assembly between the tow vehicle and the front axle assembly of the trailer. The steering arm assembly includes a pair of steering arms having tow vehicle ends and trailer ends. The tow vehicle ends are adapted for omni-directional attachment to the tow vehicle equidistant from the single articulation point. The trailer ends are adapted for omni-directional attachment to the front axle assembly of the trailer equidistant from the vertical pivot axis of the front axle assembly, thereby accommodating relative movement of the tow vehicle and the front axle assembly of the trailer while causing a proportionate change in the angular positioning of the front axle assembly of the trailer to maintain correct steering geometry of the trailer relative to the tow vehicle as the tow vehicle turns.

22 Claims, 8 Drawing Sheets

METHOD AND APPARATUS FOR CONNECTING A TOW VEHICLE TO A TRAILER HAVING A FRONT AXLE ASSEMBLY WHICH PIVOTS ABOUT A VERTICLE AXIS

The present invention relates to a method and apparatus for connecting a tow vehicle to a trailer having a front axle assembly which pivots about a vertical axis.

BACKGROUND OF THE INVENTION

Most conventional commercial vehicle trailers are a development of the original two axle horse-drawn cart, and are equipped with a front axle assembly which pivots about a vertical axis and a drawbar which is connected to the front axle assembly so that the rear of the drawbar pivots about a horizontal transverse axis. The full weight of the trailer is accordingly supported by its front and rear axles and, if the trailer is braked, the only significant hitch loads at the rear of the towing vehicle are those required to pull the trailer. However, the inherent weakness of this design of trailer is that it has two articulation points: one at the hitch point at the rear of the towing vehicle, and the second at the vertical pivot axis of the front axle assembly. Various problems arise from the presence of two articulation points. Firstly, the drawbar tends to jackknife when the vehicle combination is operated in reverse, so that it is impractical to manoeuvre such a trailer in reverse except for short distances in a straight line. Secondly, the drawbar tends to jackknife under emergency braking. Thirdly the trailer suffers from the phenomenon known as rearward amplification. That is to say, the trailer swings more than the towing vehicle during high speed steering manoeuvres. This is a particular problem when several trailers are connected together.

Various designs have been proposed to overcome the fundamental disadvantage of the conventional trailer, which is often referred to as an "A" dolly trailer. However, practical factors such as cost and incompatibility with existing equipment have limited their widespread use.

The most common alternative designs are referred to as a "B" train and a "C" dolly (also referred to as a "B" dolly). In the "B" train, the rear of the frame of the lead trailer is extended to accommodate a fifth wheel for coupling to the following semi-trailer. This eliminates one articulation point, with an improvement in stability and manoeuvrability. However, the disadvantages compared with an "A" dolly trailer include a degradation of the off-tracking performance, increased frame stressing, cost, and incompatibility with conventional "A" dolly trailers. Further problems follow from the use of two or three axles in the area of the fifth wheel, which results in increased tire wear, and in an increase in road load concentration which would be unacceptable in some jurisdictions. Only some of these problems are overcome with the use of a "C" dolly, which is connected to the lead trailer with two pintle hooks but which permits articulation of the rearmost axle. Finally, for many practical reasons, the "B" train and its derivatives are not suitable for connecting a truck and conventional "A" dolly trailer.

In summary, the conventional "A" dolly trailer design benefits from having the entire weight of the trailer supported by its own axles. However, the presence of two articulation points adversely affects both its dynamic stability and its ability to operate in reverse. In the "B" train and "C" dolly trailer designs, the advantages of having only one articulation point are offset by the disadvantages associated with having part of the trailer weight directly supported by the towing vehicle. This results in increased frame stressing, large road load concentration, and increased tire wear.

SUMMARY OF THE INVENTION

What is required is a method of connecting a tow vehicle to a trailer which overcomes the disadvantages evident in the prior art.

According to one aspect of the invention there is provided a method of connecting a tow vehicle to a trailer having a front axle assembly which pivots about a vertical axis. The method includes the following steps which will be hereinafter described. Firstly, position a drawbar assembly between the tow vehicle and the trailer. The drawbar assembly has a tow vehicle end and a trailer end. The tow vehicle end is mounted to a single articulation point at a rear of the tow vehicle. The trailer end is pivotally mounted on a substantially horizontal transverse axis thereby accommodating relative up and down movement while precluding side to side movement of the drawbar assembly. Secondly, position a steering arm assembly between the tow vehicle and the front axle assembly of the trailer. The steering arm assembly includes a pair of steering arms having tow vehicle ends and trailer ends. The tow vehicle ends are adapted for omni-directional attachment to the tow vehicle equidistant from the single articulation point. The trailer ends are adapted for omni-directional attachment to the front axle assembly of the trailer equidistant from the vertical pivot axis of the front axle assembly, thereby accommodating relative movement of the tow vehicle and front axle assembly of the trailer while causing a proportionate change in the angular positioning of the front axle assembly of the trailer to maintain correct steering geometry of the trailer relative to the tow vehicle as the tow vehicle turns. The steering arm assembly includes means to accommodate fore and aft movement of the trailer ends of the steering arms relative to the front axle assembly of the trailer.

The method, as described, combines the advantages of the conventional trailer with the advantages inherent in having only one articulation point. While there are alternative means for accommodating fore and aft movement of the trailer ends of the steering arms relative to the front axle assembly of the trailer, it is preferred that a transverse horizontal shaft be positioned parallel to the front axle assembly of the trailer. The transverse horizontal shaft has radial members to which the trailer ends of the steering arms are attached. The radial members pivot about an axis represented by the transverse horizontal shaft in response to fore and aft movement of the trailer ends of the steering arms relative to the front axle assembly of the trailer.

It should be noted that the angular positioning of the front axle assembly is not significantly effected by relative changes in attitude, such as roll and pitch, between the tow vehicle and the trailer. The overall concept is intended to isolate steering articulation in the steering arms and "filter out" other influences, such as pitch and roll, that could adversely effect steering. For this reason, in most situations the single articulation point will be in the form of an omni-directional coupling, such as a ball joint or a pintle hook coupling. In some situations, however, it is desirable that the single articulation point be in the form of a fifth wheel platform coupling in order to couple the tow vehicle and the trailer in roll. For example, a fifth wheel platform coupling is superior when making critical evasive manoeuvres to avoid obstacles.

Although beneficial results may be obtained through the use of the method, as described, there are some situations in which a conventional "A" dolly coupling remains desirable in order to minimize off-tracking when manoeuvring around tight turns. Even more beneficial results may, therefore, be obtained if provision is made that enables the method of connecting the tow vehicle to the trailer to be altered to suit operating conditions. According to this aspect of the invention the trailer end of the drawbar assembly includes a central drawbar mounted for omni-directional movement. A rigid support frame is pivotally mounted on a substantially horizontal transverse axis thereby accommodating relative up and down movement while precluding side to side movement of the rigid support frame. Means is provided for selectively locking the central drawbar to the support frame thereby precluding side to side movement of the central drawbar. The steering arm assembly includes a transverse support on the tow vehicle to which the tow vehicle ends of the steering arms are attached. The transverse support has a plurality of steering arm mounting positions whereby the spacing of the tow vehicle ends of the steering arms are adjusted relative to the single articulation point.

With the method, as described, the connection according to the present invention is altered to a conventional "A" dolly connection by releasing the central drawbar from the rigid support frame, and positioning the tow vehicle ends of the steering arms immediately adjacent to the single articulation point.

According to another aspect of the present invention there is provided an apparatus for connecting a tow vehicle to a trailer having a front axle assembly which pivots about a vertical axis. The apparatus follows the teaching of the method and includes a drawbar assembly having a tow vehicle end and a trailer end. The tow vehicle end is mounted to a single articulation point at a rear of the tow vehicle. The trailer end is pivotally mounted on a substantially horizontal transverse axis thereby accommodating up and down movement while precluding side to side movement of the drawbar assembly. A steering arm assembly is provided which includes a pair of steering arms having tow vehicle ends and trailer ends. The tow vehicle ends are adapted for omni-directional attachment to the tow vehicle equidistant from the single articulation point. The trailer ends are adapted for omni-directional attachment to the front axle assembly of the trailer equidistant from the vertical pivot axis of the front axle assembly, thereby accommodating relative movement of the tow vehicle and the front axle assembly of the trailer while causing a proportionate change in the angular positioning of the front axle assembly of the trailer to maintain correct steering geometry of the trailer relative to the tow vehicle as the tow vehicle turns. The steering arm assembly includes means to accommodate fore and aft movement of the trailer ends of the steering arms relative to the front axle assembly of the trailer.

Although correct steering geometry can be maintained up to very large articulation angles through the use of the apparatus, as described, the optimum steering geometry for a trailer may change as operating conditions change or during emergencies. It is desirable that the steering geometry be capable of alteration, preferably without having to stop the vehicle. Even more beneficial results may, therefore be obtained when the steering arm assembly includes a transverse horizontal support shaft to which one of the tow vehicle ends and the trailer ends of the steering arms are attached. The ends of the steering arms are movable along the transverse horizontal support shaft whereby the relative spacing of the ends of the steering arms are adjusted. An actuator engages the ends of the steering arms whereby separation between the ends of the steering arms is effected. A position sensor is provided whereby the separation between the ends of the steering arms is sensed. At least one operating condition sensor is also provided whereby a selected operating condition is monitored. A microprocessor is linked with the actuator, the position sensor and the at least one operating condition sensor. The microprocessor is programmed to receive signals from the position sensor and the at least one operating condition sensor and send signals to the actuator to alter the relative spacing of the ends of the steering arms to optimize steering geometry as operating conditions change.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

The method of connecting a tow vehicle to a trailer having a front axle assembly which pivots about a vertical axis, will now be described with reference to FIGS. 1 through 8. FIGS. 1 through 8 illustrate four different embodiments as will hereinafter be further described, demonstrating how the method can be applied to different types of trailers and demonstrating refinements to the method.

Figure 1:
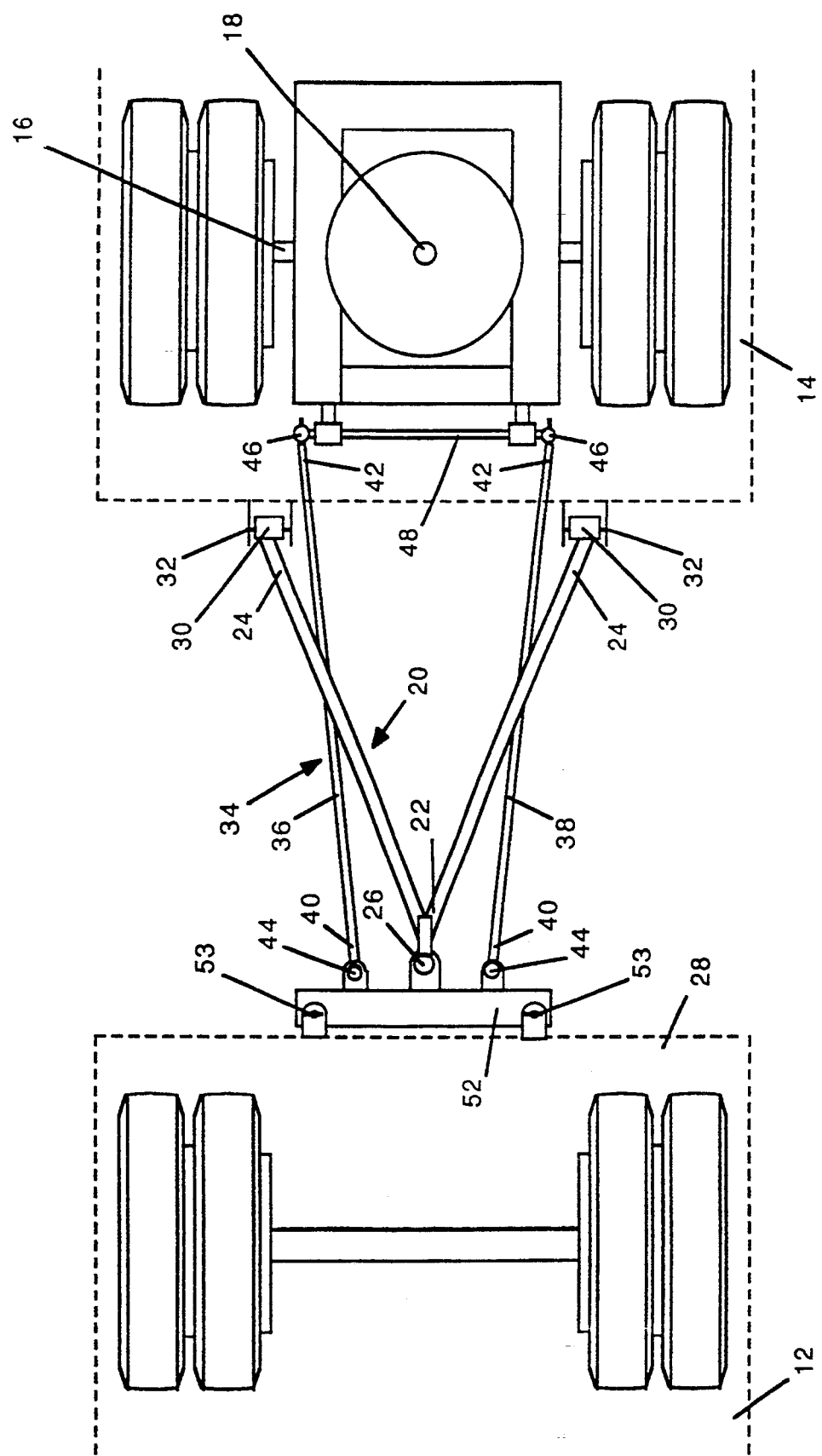
FIG. 1 is a top plan view of a first embodiment illustrating a connection between a tow vehicle and a trailer in accordance with the teachings of the present invention.
Figure 2:
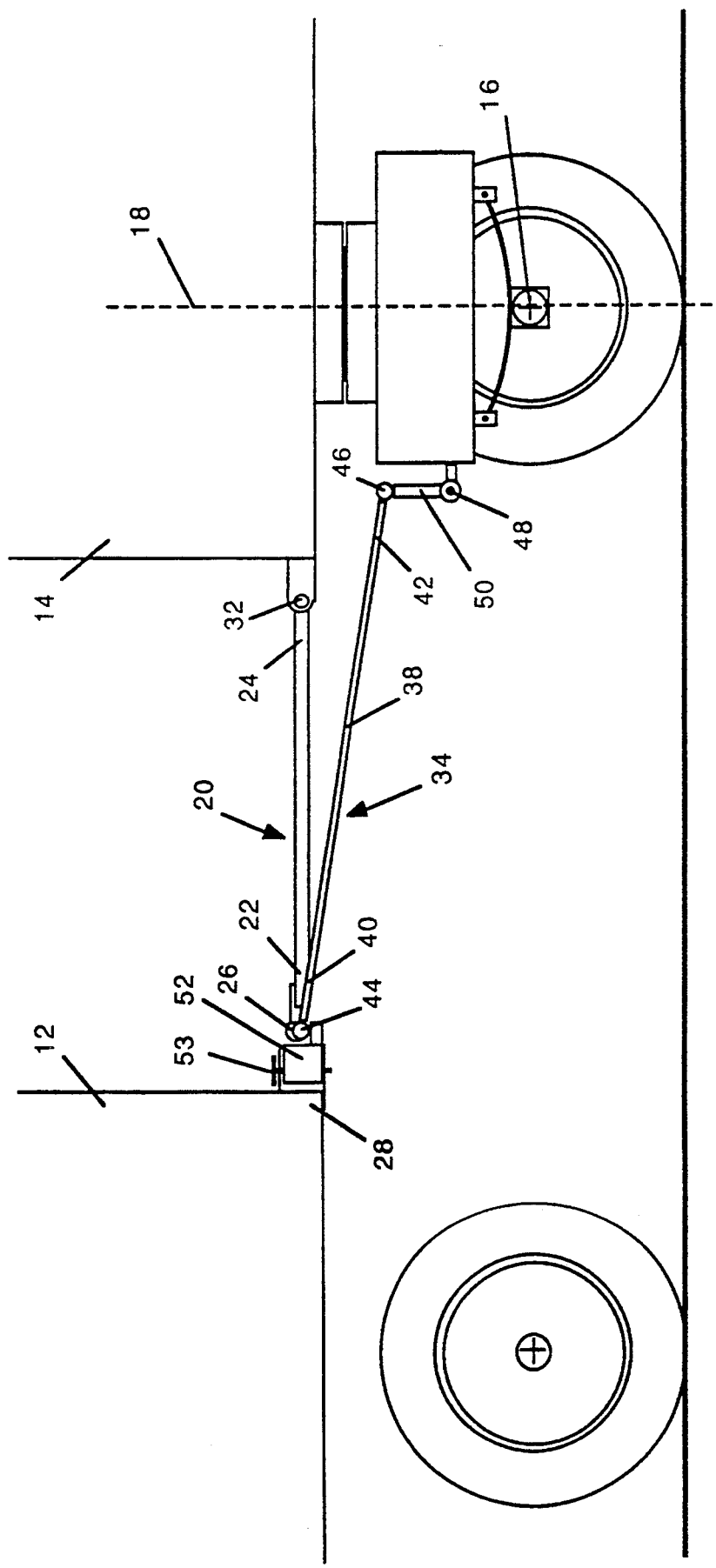
FIG. 2 is a side elevation view of the connection as illustrated in FIG. 1.

Referring to FIGS. 1 and 2, the method involves connecting a tow vehicle 12 to a trailer 14. The type of trailer 14 is one having a front axle assembly 16 which pivots about a vertical axis 18. Firstly, position a drawbar assembly, generally identified by reference numeral 20, between tow vehicle 12 and trailer 14. Drawbar assembly 20 has a tow vehicle end 22 and a trailer end 24. Tow vehicle end 22 is mounted with an omni-directional type of coupling at a rear 28 of tow vehicle 12 which accommodates omni-directional relative movement of tow vehicle 12 and front axle assembly 16 of trailer 14. The type of omni-directional coupling illustrated is a ball joint connection 26, but it will be appreciated that other types of coupling such as a pintle hook coupling could be used. Ball joint connection 26 serves as a single articulation point for drawbar assembly 20, as will hereinafter be further described. Trailer ends 24 are positioned on a substantially horizontal transverse axis, as defined by mounting pins 32. The means of attachment to the horizontal transverse axis, as illustrated, are two hinges 30. It will be appreciated that a single piano type hinge or a similar alternate linkage could be used. Hinges 30 pivot about the horizontal axis represented by mounting pins 32, thereby accommodating up and down movement while precluding side to side movement of drawbar assembly 20. Secondly, position a steering arm assembly, generally identified by reference numeral 34, between tow vehicle 12 and front axle assembly 16 of trailer 14. Steering arm assembly 34 includes a pair of steering arms 36 and 38. Each of steering arms 36 and 38 have tow vehicle ends 40 and trailer ends 42. Tow vehicle ends 40 are mounted with omni-directional connections, in this case ball joint type of connections 44, to rear 28 of tow vehicle 12, equidistant from the single articulation point as represented by ball joint connection 26. Ball joint connections 44 accommodate omni-directional relative movement of tow vehicle 12 and trailer 14. Trailer ends 42 are similarly attached with omni-directional connections, in this case ball joint type of connections 46, to front axle assembly 16 of trailer 14 equidistant from vertical pivot axis 18 of front axle assembly 16. Ball joint connections 46 accommodate omni-directional relative movement of tow vehicle 12 and front axle assembly 16 of trailer 14. The primary movement which ball joint connections 44 and 46 must accommodate being articulation between tow vehicle 12 and front axle assembly 16 of trailer 14. They also accommodate relative up and down movement, pitch and roll of tow vehicle 12 and trailer 14. Steering arm assembly 34 causes a proportionate change in the angular positioning of front axle assembly 16 of trailer 14 to maintain correct steering geometry of trailer 14 relative to tow vehicle 12 as tow vehicle 12 turns. Steering arm assembly 34 also includes means to accommodate fore and aft movement of trailer ends 42 relative to front axle assembly 16 of trailer 14. This means can vary depending upon the design of trailer 14. An alternate means to accommodate fore and aft movement will hereinafter be described in relation to FIG. 5. In FIGS. 1 through 4 the means to accommodate relative fore and aft movement includes a transverse horizontal shaft 48 parallel to front axle assembly 16 of trailer 14. Transverse horizontal shaft 48 has radial members 50 to which trailer ends 42 of steering arms 36 and 38 are attached. Transverse horizontal shaft 48 rotates enabling radial members 50 to pivot about an axis represented by transverse horizontal shaft 48 in response to fore and aft movement of trailer ends 42 of steering arms 36 and 38 relative to front axle assembly 16 of trailer 14.

Figure 3:
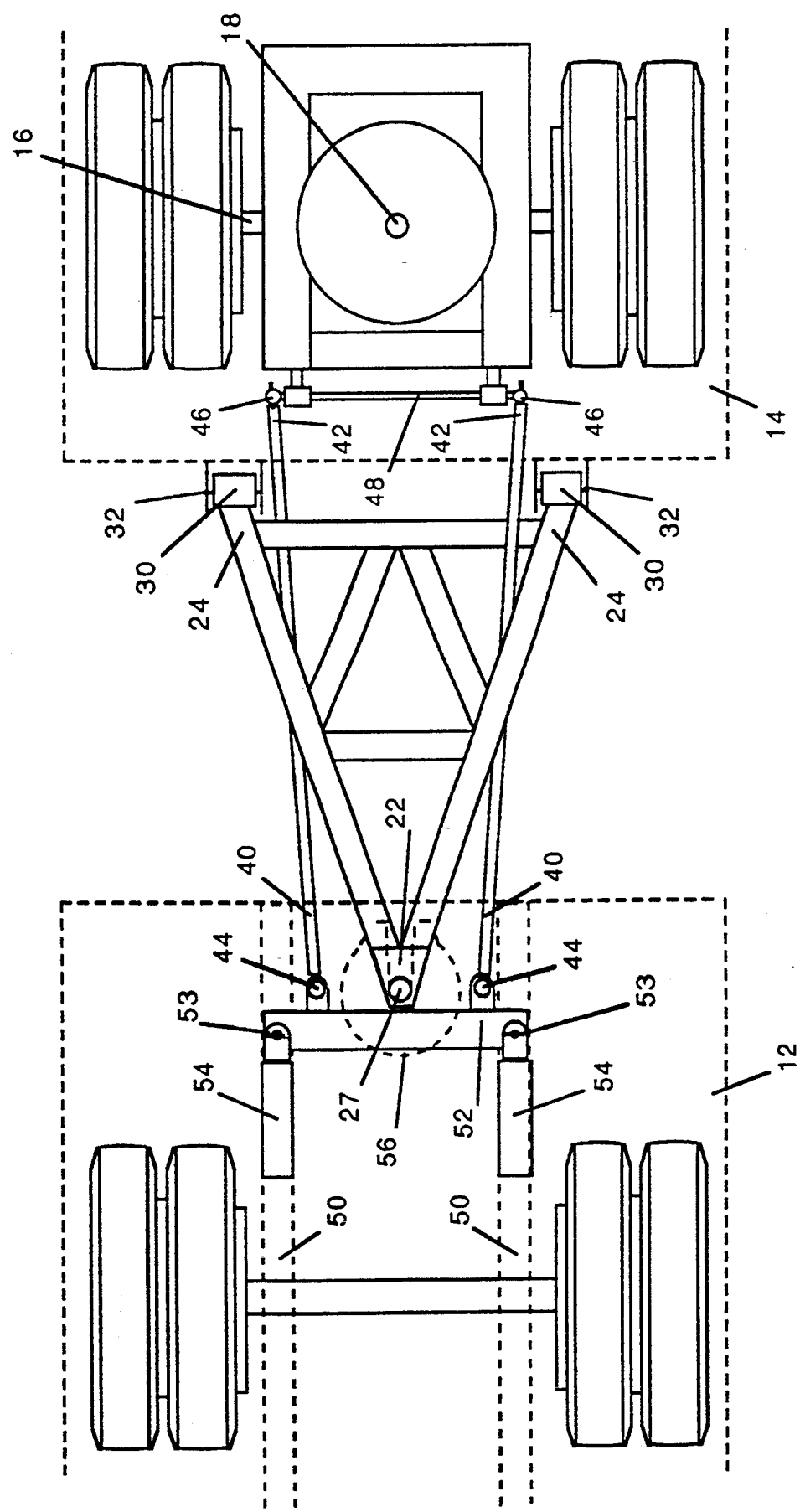
FIG. 3 is a top plan view of a second embodiment illustrating a connection between a tow vehicle and a trailer in accordance with the teachings of the present invention.
Figure 4:
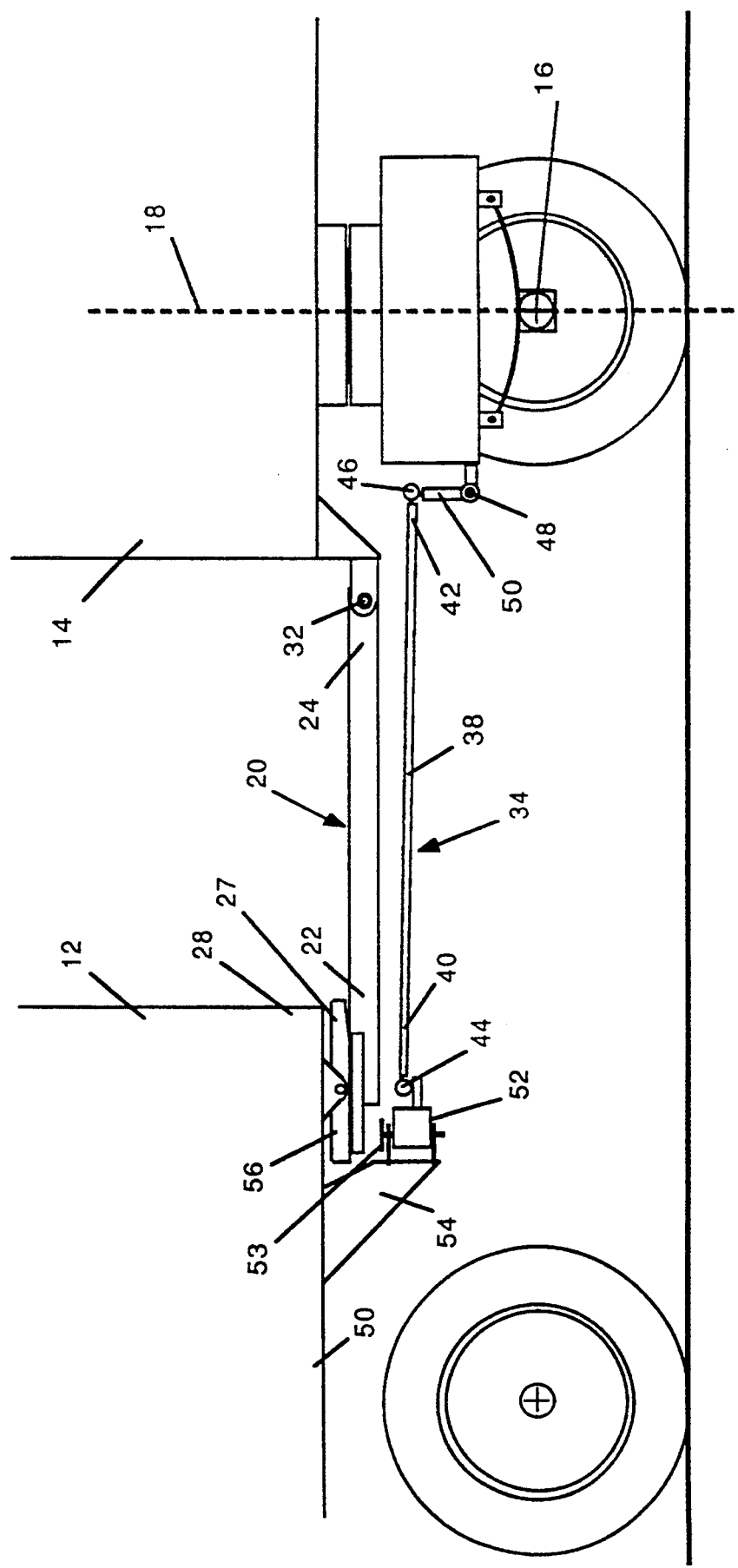
FIG. 4 is a side elevation view of the connection as illustrated in FIG. 3.

FIGS. 3 and 4, as compared to FIGS. 1 and 2, serve to illustrate that the teachings of the present method are equally applicable to alternate means of attachment of tow vehicle 12 and trailer 14. In FIGS. 1 and 2, ball joint connections 26 and 44 are positioned on a hitch bar 52 which projects rearwardly from tow vehicle 12. Hitch bar 52 is secured to tow vehicle 12 by means of pins 53 which enables hitch bar 52 to be quickly attached and detached. The use of hitch bar 52 places ball joint connections 26 and 44 in substantially horizontal alignment on a common plane. Ball joint connection 26 permits omni-directional movement of trailer 14 relative to tow vehicle 12, so trailer 14 and tow vehicle 12 are not coupled in roll. In FIGS. 3 and 4, a fifth wheel platform coupling 27 is illustrated as an alternative to ball joint connection 26. Fifth wheel platform coupling 27 couples trailer 14 and tow vehicle 12 in roll. This improves dynamic stability when making critical evasive manoeuvres or negotiating a series of turns as might be found travelling through mountain regions. Fifth wheel platform coupling 27 and ball joint coupling 44 are positioned at rear 28 of tow vehicle 12, but they are spaced inwardly slightly and hitch bar 52 is attached to attachment brackets 54 which depend from an undercarriage 56 of tow vehicle 12. It should also be noted that in FIGS. 3 and 4, drawbar assembly 20 and steering arm assembly 34 are not on the same plane. Steering arms 36 and 38 are positioned below drawbar assembly 20.

Figure 5:
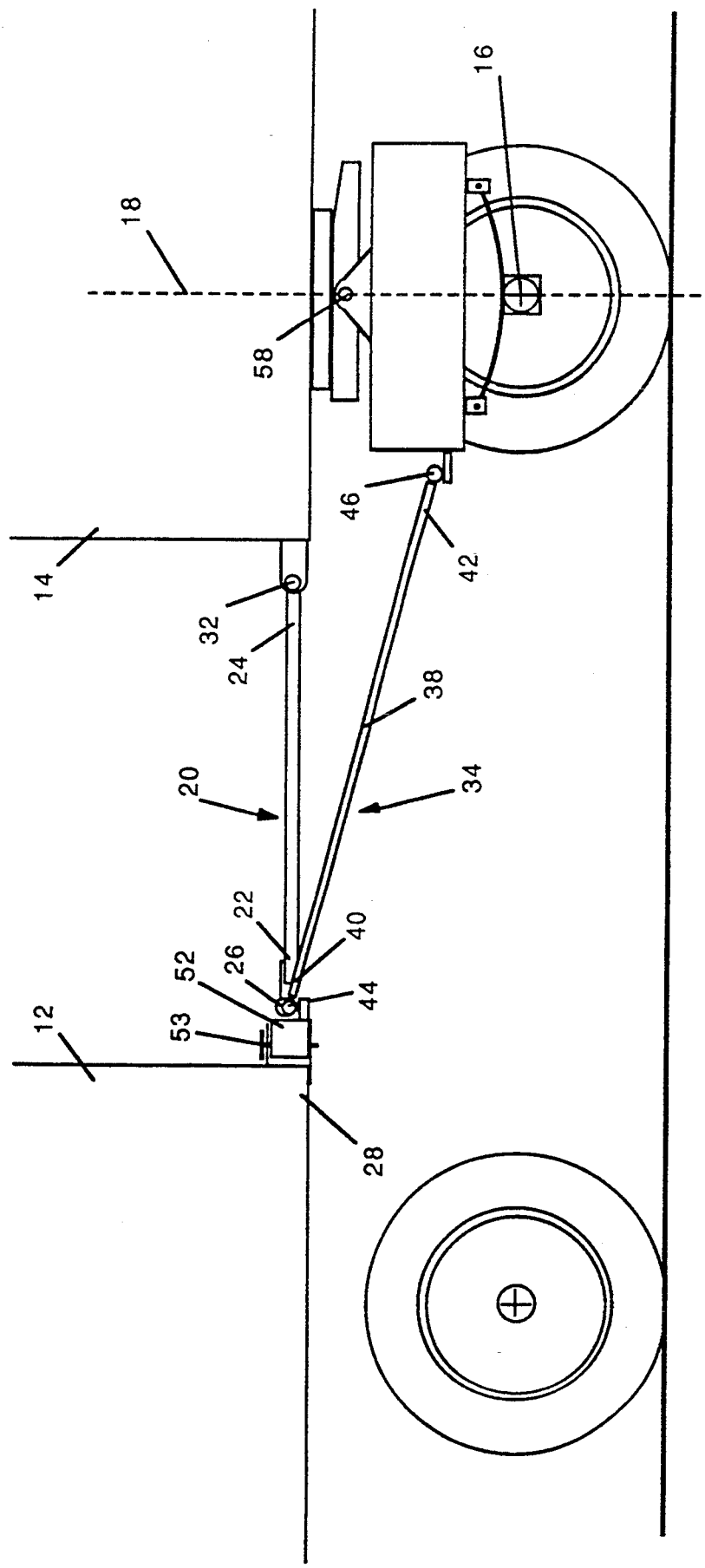
FIG. 5 is a side elevation view of a third embodiment illustrating a connection between a tow vehicle and a trailer in accordance with the teachings of the present invention.

In FIG. 5 there is provided an alternate means to accommodate fore and aft movement of trailer ends 42 of steering arms 36 and 38 relative to front axle assembly 16 of trailer 14. Front axle assembly 16 is pivotally mounted to a transverse pivot axis 58. Front axle assembly 16 is capable of limited fore and aft movement about transverse pivot axis 58. This form of front axle assembly is often found is association with fifth wheel connections. In all other respects the connection is identical to that represented in FIGS. 1 and 2.

Figure 6:
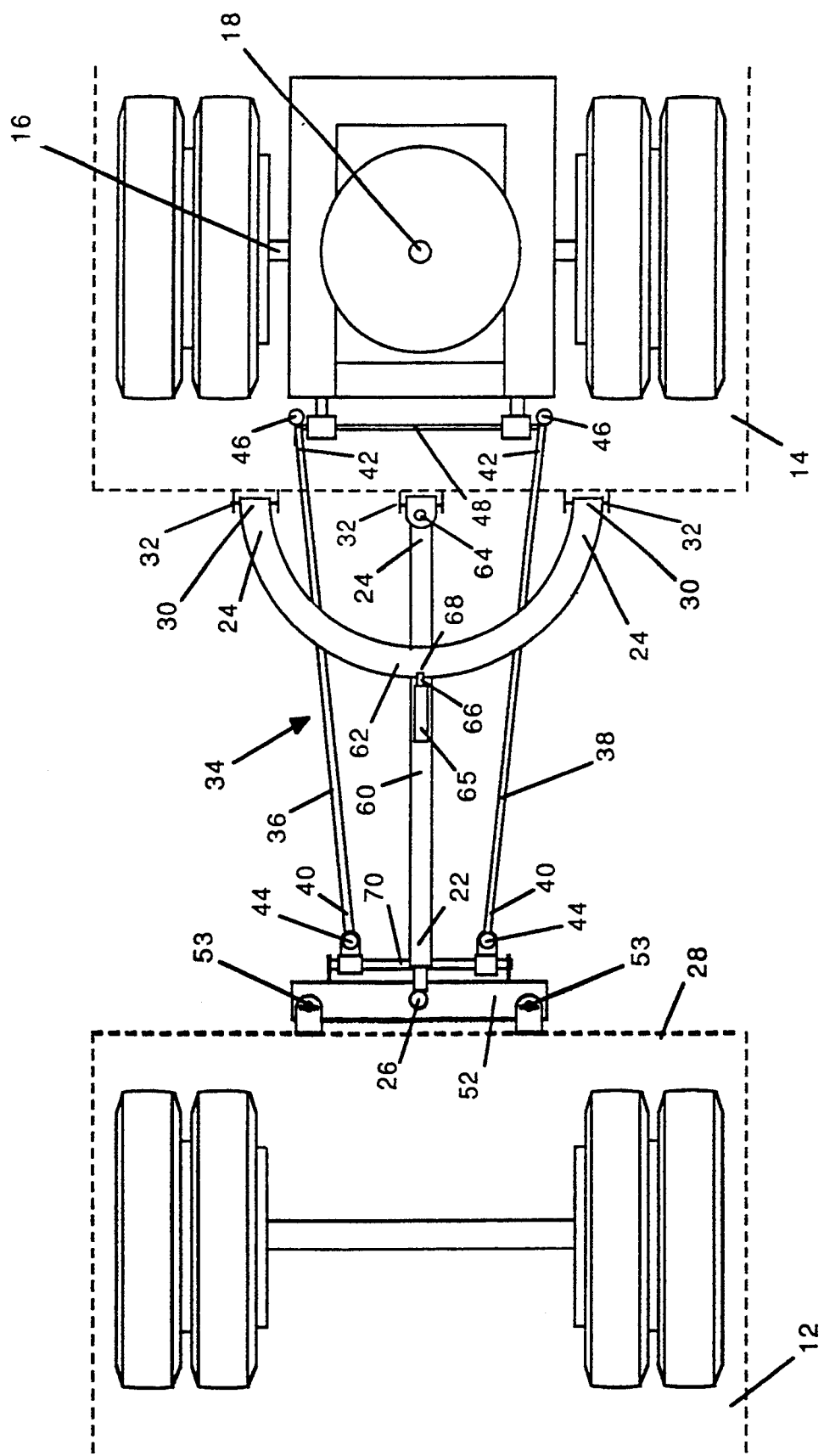
FIG. 6 is a top plan view of a fourth embodiment illustrating a connection between a tow vehicle and a trailer in accordance with the teachings of the present invention with the central drawbar and the rigid support frame engaged.
Figure 7:
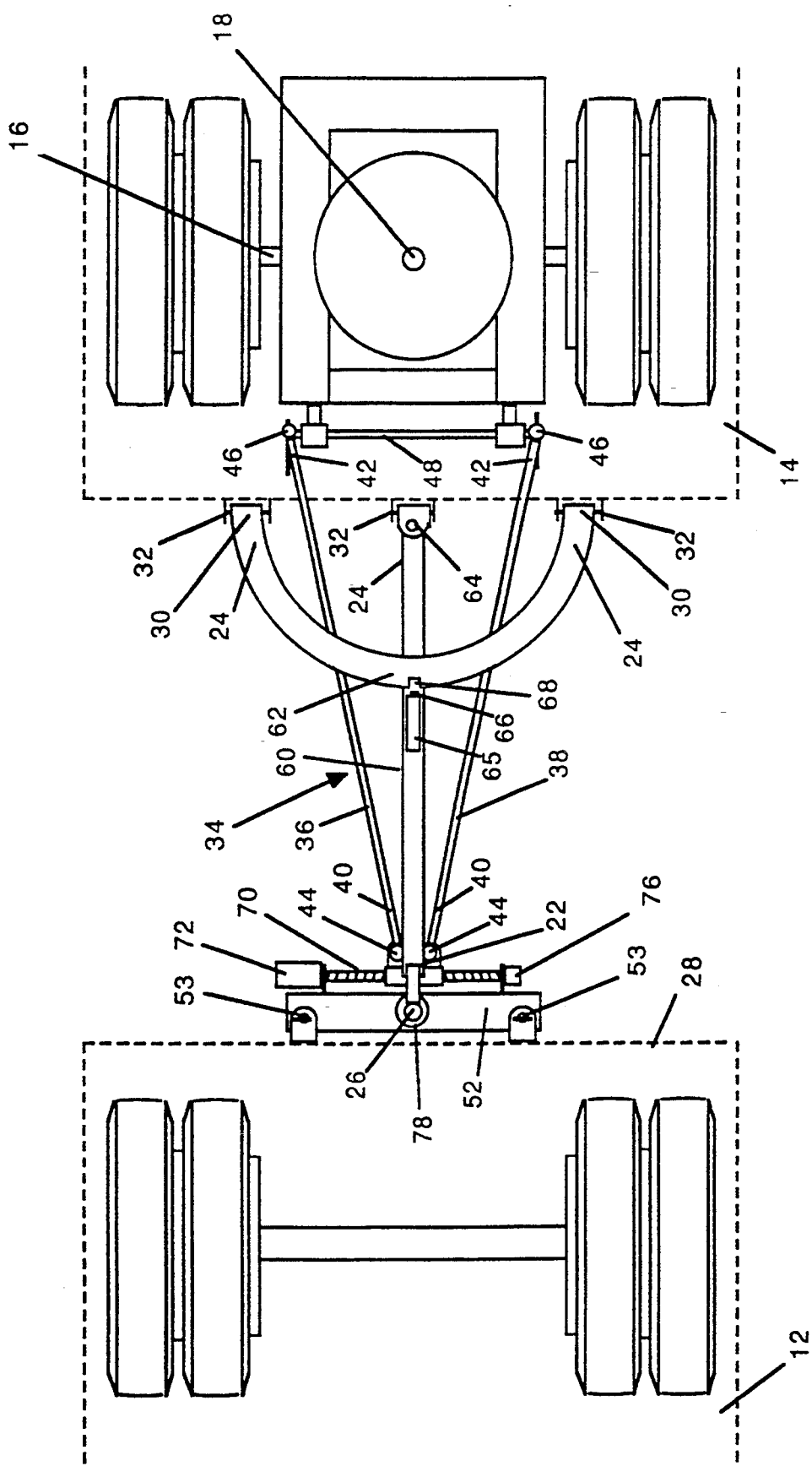
FIG. 7 is a top plan view of the connection as illustrated in FIG. 6, in an "A" dolly configuration with the central drawbar and the rigid support frame disengaged.

FIGS. 6 and 7, illustrate a refinement in which the embodiment can be converted to a conventional "A" dolly configuration. In this embodiment trailer end 24 of drawbar assembly 20 is divided into two components; a central drawbar 60 and a rigid support frame 62. Central drawbar 60 is attached to trailer 14 by a universal joint style of connection 64 which permits central drawbar 60 to accommodate relative omni-directional movement of tow vehicle 12 and trailer 14. Rigid support frame 62 is pivotally mounted on a substantially horizontal transverse axis, as defined by mounting pins 32. The means of attaching rigid support frame 62 to horizontal transverse axis includes two hinges 30 which serve as mounting points. Hinges 30 pivot about the horizontal axis represented by mounting pins 32, thereby accommodating up and down movement while precluding side to side movement of drawbar assembly 20. When in a conventional "A" dolly configuration, as illustrated in FIG. 7, rigid support frame 62 is detached from central drawbar 60 and plays a "neutral" role. Means is provided for selectively locking central drawbar 60 to support frame 62. This precludes side to side movement of central drawbar 60, and places drawbar assembly 20 into a configuration which duplicates the action of the embodiments illustrated in FIGS. 1 through 5. The locking means illustrated in FIGS. 6 and 7, includes a housing 65 on central drawbar 60 which houses a male locking member 66. Male locking member 66 mates with a female locking member 68 on rigid support frame 62. By extending male locking member 66 into female locking member 68, central drawbar 60 is locked to rigid support frame 62. In order to convert to a conventional "A" dolly configuration, steering arm assembly 34 is also in need of modification. Steering arm assembly 34 must include a transverse support 70 on tow vehicle 12 to which tow vehicle ends 40 of steering arms 36 and 38 are attached. Transverse support 70 has a plurality of steering arm mounting positions whereby the spacing of tow vehicle ends 40 of steering arms 36 and 38 are adjusted relative to the single articulation point represented by ball joint 26. In FIGS. 6 and 7, there is illustrated a transverse support 70 which is in the form of a horizontal shaft. Tow vehicle ends 40 of steering arms 36 and 38 are slidable along transverse horizontal support shaft 70. Transverse horizontal support shaft 70 provides a plurality of steering arm mounting positions. Although it is preferred that adjustment be made by sliding, it will be appreciated that the plurality of steering arm mounting positions could consist of a series of attachment points as opposed to a continuous support shaft, as illustrated. A continuous support shaft is preferred as tow vehicle ends 40 of steering arms 36 and 38 can be adjusted and locked in position by a remote activator (not shown) which adjusts the spacing of tow vehicle ends 40 hydraulically (not shown) or by a mechanical adjustment screw (not shown). When tow vehicles ends 40 of steering arms 36 and 38 are positioned immediately adjacent to the single articulation point as represented by ball joint connection 26, as illustrated in FIG. 7, the performance of a conventional "A" dolly configuration is duplicated. The ability to adjust the positioning of tow vehicle ends 40 is also useful in adapting steering arm assembly 34 to suit the particular steering geometry of tow vehicle 12 and trailer 14.

By following the teachings of the method the primary advantage of the conventional trailer of having all of its weight supported by the trailer axles is combined with a single articulation point, as illustrated in FIGS. 1 and 2. In addition, tow vehicle 12 can be coupled to trailer 14 in roll for improved dynamic stability, as illustrated in FIGS. 3 and 4. The system can also be modified, as illustrated in FIGS. 6 and 7, to permit the system to be switched back to a conventional "A" dolly configuration when improved off-tracking is required.

Figure 8:
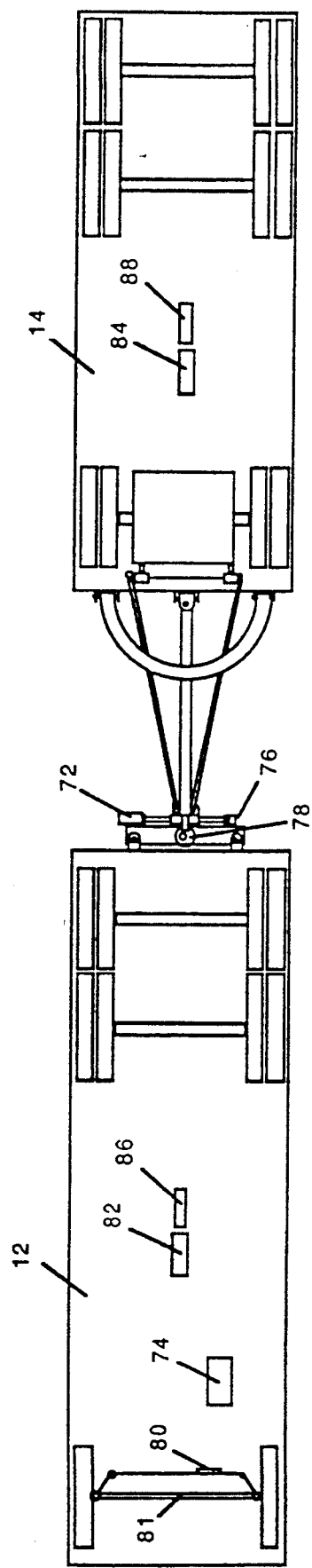
FIG. 8 is a top plan view of a modified version of the fourth embodiment.

The separation distance between ball joint connections 44 at tow vehicle ends 40 of steering arms 36 and 38 must be accurately determined in order to provide the correct steering geometry of the trailer axles. The correct separation distance is only marginally affected by the distance from the normal location of the rear axle of the tow vehicle to the location of the single articulation point, and accordingly there would not normally be any need to alter the separation distance. However, it is anticipated that alternative locations of ball joint connections 44 might be preferred, and these can be accommodated in various ways. Firstly, additional attachment points can be incorporated into hitch bar 52. Secondly, a mechanical means can be provided which increases the separation distance between ball joint connectors 44 as the articulation angle between tow vehicle 12 and trailer 14 increases in order to maintain correct steering geometry of trailer 14 relative to tow vehicle 12 at large articulation angles. Thirdly, electrical or hydraulic actuator means can be provided to vary the separation distance between ball joint connections 44 in response to dynamic behaviour of tow vehicle 12 and trailer 14. Referring to FIGS. 7 and 8, an actuator 72, a microprocessor 74, and a position sensor 76 and a plurality of operating condition sensors 78, 80, 84, 86, and 88 have been incorporated into the design. Position sensor 76 monitors the separation distance between ball joint connections 44 at tow vehicle ends 40 of steering arms 36 and 38. Operating condition sensor 78 monitors an articulation angle between tow vehicle 12 and trailer 14. Operating condition sensor 80 monitors a steering angle of a front axle 81 of tow vehicle 12. Operating condition sensor 82 monitors a lateral acceleration of a center of mass of tow vehicle 12. Operating condition sensor 84 monitors a lateral acceleration of a center of mass of trailer 14. Operating condition sensor 86 monitors a roll angle of tow vehicle 12. Operating condition sensor 88 monitors a roll angle of trailer 14. As previously described, steering arm assembly 34 includes a transverse horizontal support shaft 70 to which tow vehicle ends 40 of steering arms 36 and 38 are attached. Tow vehicle ends 40 of steering arms 36 and 38 are movable along transverse horizontal support shaft 70 whereby the relative spacing of tow vehicle ends 40 of steering arms 36 and 38. Actuator 72 engages tow vehicle ends 40 of steering arms 36 and 38 and serves as the mechanism whereby separation between tow vehicle ends 40 of steering arms 36 and 38 is effected. There are a number of different types of hydraulic or mechanical actuators which can be used. Actuator 72, as illustrated, is a small motor which rotates transverse horizontal support shaft 70. Transverse horizontal support shaft 70 is threaded on one side with left hand threads and on the other side with right hand threads. This means that when actuator 72 rotates shaft 70 in one direction tow vehicle ends 40 move toward each other. Conversely, when actuator 72 rotates shaft 70 in the opposite direction tow vehicle ends 40 move away from each other. Position sensor 76 determines the relative positioning of tow vehicle ends 40 of steering arms 36 and 38. There is a number of ways in which this can be done. In the illustrated embodiment position sensor 76 determines the positioning of tow vehicle ends 40 by sensing the number of rotations and direction of rotation of shaft 70. The various operating condition sensors 78, 80, 82, 84, 86, and 88 monitor selected operating conditions. In order for the system to operate at least one operating condition must be monitored. Changes in the monitored operating condition are used as a signal to change the relative positioning of tow vehicle ends 40 of steering arms 36 and 38. Microprocessor 74 is linked with actuator 72, position sensor 76 and at least one of operating condition sensors 78, 80, 82, 84, 86, and 88. Microprocessor 74 is programmed to receive signals from position sensor 76 and at least one of operating condition sensors 78, 80, 82, 84, 86, and 88. Microprocessor 74 then sends signals to actuator 72 to alter the relative spacing of tow vehicle ends 40 of steering arms 36 and 38 to optimize steering geometry as operating conditions change. Accordingly, the steering angle of front axle assembly 16 can be varied actively to modify the dynamic behaviour of tow vehicle 12 and trailer 14. The same adjustment of steering geometry can be achieved by varying the separation distance between ball joint connections 46 at trailer ends 42 of steering arms 36 and 38.

It will be apparent to one skilled in the art that modifications may be made to the illustrated embodiments without departing from the spirit and scope of the invention as defined by the Claims. For example, hitch bar 52 is preferred for reasons of convenience of attaching and detaching, but must not be considered essential.

The embodiments of the invention in which an exclusive property or privilege is claimed are defined as follows:

1. A method of connecting a tow vehicle to a trailer having a front axle assembly which pivots about a vertical axis, the method comprising the steps of:
   a. firstly, positioning a drawbar assembly between the tow vehicle and the trailer, the drawbar assembly having a tow vehicle end mounted to a single articulation point at a rear of a tow vehicle and a trailer end pivotally mounted to a front of a trailer on a substantially horizontal transverse axis thereby accommodating up and down movement and precluding side to side movement of the drawbar assembly; and
   b. secondly, positioning a steering arm assembly between the tow vehicle and the front axle assembly of the trailer, the steering arm assembly including a pair of steering arms having tow vehicle ends omni-directionally attached to the tow vehicle equidistant from the single articulation point and trailer ends omni-directionally attached to the front axle assembly of the trailer equidistant from the vertical pivot axis of the front axle assembly, thereby accommodating relative movement of the tow vehicle and the front axle assembly of the trailer while causing a proportionate change in the angular positioning of the front axle assembly of the trailer to maintain correct steering geometry of the trailer relative to the tow vehicle as the tow vehicle turns, the steering arm assembly including means to accommodate simultaneous fore movement and simultaneous aft movement of the trailer ends of the steering arms relative to the trailer.

2. The method as defined in claim 1, the means to accommodate relative fore and aft movement of the trailer ends of the steering arms relative to the trailer including a front axle assembly pivotally mounted to a transverse pivot axis.

3. The method as defined in claim 1, the trailer end of the drawbar assembly including a central drawbar mounted for omni-directional movement, a rigid support frame pivotally mounted on a substantially horizontal transverse axis thereby accommodating up and down movement and precluding side to side movement of the rigid support frame, and means for selectively locking the central drawbar to the support frame thereby precluding side to side movement of the central drawbar; and the steering arm assembly including a transverse support on the tow vehicle to which the tow vehicle ends of the steering arms are attached, the transverse support having multiple steering arm mounting positions whereby spacing of the tow vehicle ends of the steering arms are adjusted relative to the single articulation point.

4. The method as defined in claim 1, the single articulation point being in the form of an omni-directional coupling.

5. The method as defined in claim 1, the single articulation point being in the form of a fifth wheel platform coupling thereby coupling the tow vehicle and the trailer in roll.

6. The method as defined in claim 1, the means to accommodate relative fore and aft movement of the trailer ends of the steering arms relative to the trailer including a transverse horizontal shaft parallel to the front axle assembly of the trailer, the transverse horizontal shaft having radial members to which the trailer ends of the steering arms are attached, the radial members pivoting about an axis represented by the transverse horizontal shaft in response to fore and aft movement of the trailer ends of the steering arms relative to the front axle assembly of the trailer.

7. A trailer in combination with an apparatus for connecting the trailer to a tow vehicle, comprising:
   a. a trailer having a front axle assembly which pivots about a vertical axis;
   b. a drawbar having a tow vehicle end in the form of a fifth wheel platform coupling adapted for mounting to a single articulation point at a rear of a tow vehicle thereby coupling the tow vehicle and the trailer in roll, and a trailer end mounted to a front of a trailer including a central drawbar mounted for omni-directional movement, a rigid support frame pivotally mounted on a substantially horizontal transverse axis thereby accommodating up and down movement and precluding side to side movement of the rigid support frame, and means for selectively locking the central drawbar to the support frame thereby precluding side to side movement of the central drawbar; and
   c. a steering arm assembly including a pair of steering arms having tow vehicle ends adapted for omni-directional attachment to the tow vehicle equidistant from the single articulation point, and trailer ends omni-directionally attached to the front axle assembly of the trailer equidistant from the vertical pivot axis of the front axle assembly, thereby accommodating relative movement of the tow vehicle and the front axle assembly of the trailer while causing a proportionate change in the angular positioning of the front axle assembly of the trailer to maintain correct steering geometry of the trailer relative to the tow vehicle as the tow vehicle turns, the steering arm assembly including a transverse support adapted for mounting on the tow vehicle to which the tow vehicle ends of the steering arms are attached, the transverse support having multiple steering arm mounting positions whereby spacing of the tow vehicle ends of the steering arms are adjusted relative to the single articulation point, the steering arm assembly including means to accommodate simultaneous fore movement and simultaneous aft movement of the trailer ends of the steering arms relative to the front axle assembly of the trailer.

8. A trailer in combination with an apparatus for connecting the trailer to a tow vehicle, comprising:
   a. a trailer having a front axle assembly which pivots about a vertical axis;
   b. a drawbar having a tow vehicle end adapted for mounting to a single articulation point at a rear of a tow vehicle and a trailer end pivotally mounted to a front of a trailer on a substantially horizontal transverse axis thereby accommodating up and down movement and precluding side to side movement of the drawbar assembly;
   c. a steering arm assembly including a pair of steering arms having tow vehicle ends adapted for omni-directional attachment to the tow vehicle equidistant from the single articulation point, and trailer ends omni-directionally attached to the front axle assembly of the trailer equidistant from the vertical pivot axis of the front axle assembly, thereby accommodating relative movement of the tow vehicle and the front axle assembly of the trailer while causing a proportionate change in the angular positioning of the front axle assembly of the trailer to maintain correct steering geometry of the trailer relative to the tow vehicle as the tow vehicle turns, the steering arm assembly including means to accommodate simultaneous fore movement and simultaneous aft movement of the trailer ends of the steering arms relative to the front axle assembly of the trailer;

c. the steering arm assembly including a transverse horizontal support shaft to which one of the tow vehicle ends and the trailer ends of the steering arms are attached, the ends of the steering arms being movable along the transverse horizontal support shaft whereby spacing of the one of the tow vehicle ends and the trailer ends of the steering arms is adjusted;

d. an actuator engagable with the one of the tow vehicle ends and the trailer ends of the steering arms whereby spacing between the one of the tow vehicle ends and the trailer ends of the steering arms is effected;

e. a position sensor whereby the spacing between the one of the tow vehicle ends and the trailer ends of the steering arms is sensed;

f. at least one operating condition sensor whereby a selected operating condition is monitored; and g. a microprocessor linked with the actuator, the position sensor and the at least one operating condition sensor, the microprocessor being programmed to receive signals from the position sensor and the at least one operating condition sensor and send signals to the actuator to alter the spacing of the one of the tow vehicle ends and the trailer ends of the steering arms to optimize steering geometry as operating conditions change.

9. A method of connecting a tow vehicle to a trailer having a front axle assembly which pivots about a vertical axis, the method comprising the steps of:

a. firstly, positioning a drawbar assembly between the tow vehicle and the trailer, the drawbar assembly having a tow vehicle end mounted to a single articulation point at a rear of a tow vehicle and a trailer end pivotally mounted to a front of a trailer on a substantially horizontal transverse axis thereby accommodating up and down movement and precluding side to side movement of the drawbar assembly, the single articulation point being in the form of an omni-directional coupling; and b. secondly, positioning a steering arm assembly between the tow vehicle and the front axle assembly of the trailer, the steering arm assembly including a pair of steering arms having tow vehicle ends omni-directionally attached to the tow vehicle equidistant from the single articulation point, and trailer ends omni-directionally attached to the front axle assembly of the trailer equidistant from the vertical pivot axis of the front axle assembly, thereby accommodating relative movement of the tow vehicle and the front axle assembly of the trailer while causing a proportionate change in the angular positioning of the front axle assembly of the trailer to maintain correct steering geometry of the trailer relative to the tow vehicle as the tow vehicle turns, the steering arm assembly including a transverse horizontal shaft parallel to the front axle assembly of the trailer, the transverse horizontal shaft having radial members to which the trailer ends of the steering arms are attached, the radial members pivoting about an axis represented by the transverse horizontal shaft in response to simultaneous fore movement and simultaneous aft movement of the trailer ends of the steering arms relative to the front axle assembly of the trailer.

10. A method of connecting a tow vehicle to a trailer having a front axle assembly which pivots about a vertical axis, the method comprising the steps of:

a. firstly, positioning a drawbar assembly between the tow vehicle and the trailer, the drawbar assembly having a tow vehicle end mounted to a single articulation point at a rear of a tow vehicle and a trailer end pivotally mounted to a front of a trailer on a substantially horizontal transverse axis thereby accommodating up and down movement and precluding side to side movement of the drawbar assembly, the single articulation point being in the form of a fifth wheel platform coupling thereby coupling the tow vehicle and the trailer in roll; and b. secondly, positioning a steering arm assembly between the tow vehicle and the front axle assembly of the trailer, the steering arm assembly including a pair of steering arms having tow vehicle ends omni-directionally attached to the tow vehicle equidistant from the single articulation point, and trailer ends omni-directionally attached to the front axle assembly of the trailer equidistant from the vertical pivot axis of the front axle assembly, thereby accommodating relative movement of the tow vehicle and the front axle assembly of the trailer while causing a proportionate change in the angular positioning of the front axle assembly of the trailer to maintain correct steering geometry of the trailer relative to the tow vehicle as the tow vehicle turns, the steering arm assembly including a transverse horizontal shaft parallel to the front axle assembly of the trailer, the transverse horizontal shaft having radial members to which the trailer ends of the steering arms are attached, the radial members pivoting about an axis represented by the transverse horizontal shaft in response to simultaneous fore movement and simultaneous aft movement of the trailer ends of the steering arms relative to the front axle assembly of the trailer.

11. A method of connecting a tow vehicle to a trailer having a front axle assembly which pivots about a vertical axis, the method comprising the steps of:

a. firstly, positioning a drawbar assembly between the tow vehicle and the trailer, the drawbar assembly having a tow vehicle end mounted for omni-directional movement to a single articulation point at a rear of the tow vehicle, and a trailer end, the trailer end of the drawbar assembly including a central drawbar mounted for omni-directional movement, a rigid support frame pivotally mounted on a substantially horizontal transverse axis thereby accommodating up and down movement while precluding side to side movement of the rigid support frame, one of the central drawbar and the support frame having a male locking member, the other of the central drawbar and the support frame having a female locking member, the male locking member extending into the female locking member thereby selectively locking the central drawbar to the support frame to preclude side to side movement of the central drawbar; and b. secondly, positioning a steering arm assembly between the tow vehicle and the front axle assembly of the trailer, the steering arm assembly including a transverse horizontal shaft mounted parallel to the front axle assembly of the trailer, the transverse horizontal shaft having radial members positioned equidistant from the vertical pivot axis of the front axle assembly, the steering arm assembly including a pair of steering arms having tow vehicle ends omni-directionally attached to the tow vehicle equidistant from the single articulation point, and trailer ends omni-directionally attached to the radial members of the transverse shaft thereby accommodating relative movement of the tow vehicle and the front axle assembly of the trailer while causing a proportionate change in the angular positioning of the front axle assembly of the trailer to maintain correct steering geometry of the trailer relative to the tow vehicle as the tow vehicle turns, the radial members pivoting about an axis represented by the transverse horizontal shaft in response to simultaneous fore movement and simultaneous aft movement of the trailer ends of the steering arms relative to the front axle assembly of the trailer, the steering arm assembly including a transverse horizontal support shaft on the tow vehicle to which the tow vehicle ends of the steering arms are attached, the tow vehicle ends of the steering arms being slidable along the transverse horizontal support shaft thereby providing a plurality of steering arm mounting positions whereby spacing of the tow vehicle ends of the steering arms are adjusted relative to the single articulation point, means being provided to lock the tow vehicle ends of the steering arms in preselected positions to the support shaft.

12. A trailer in combination with an apparatus for connecting the trailer to a tow vehicle, comprising:

a. a trailer having a front axle assembly which pivots about a vertical axis;

b. a drawbar having a tow vehicle end adapted for mounting to a single articulation point at a rear of a tow vehicle and a trailer end pivotally mounted to a front of the trailer on a substantially horizontal transverse axis thereby accommodating up and down movement and precluding side to side movement of the drawbar assembly; and c. a steering arm assembly including a pair of steering arms having tow vehicle ends adapted for omni-directional attachment to the tow vehicle equidistant from the single articulation point, and trailer ends omni-directionally attached to the front axle assembly of the trailer equidistant from the vertical pivot axis of the front axle assembly, thereby accommodating relative movement of the tow vehicle and the front axle assembly of the trailer while causing a proportionate change in the angular positioning of the front axle assembly of the trailer to maintain correct steering geometry of the trailer relative to the tow vehicle as the tow vehicle turns, the steering arm assembly including means to accommodate simultaneous fore movement and simultaneous aft movement of the trailer ends of the steering arms relative to the front axle assembly of the trailer.

13. The apparatus as defined in claim 12, the means for attaching the tow vehicle ends of the steering arms including means to adjust spacing between the tow vehicle ends of the steering arms.

14. The apparatus as defined in claim 12, the means for attaching the trailer ends of the steering arms including means to adjust spacing between the trailer ends of the steering arms.

15. The apparatus as defined in claim 12, the single articulation point being in the form of an omni-directional coupling.

16. The apparatus as defined in claim 12, the single articulation point being in the form of a fifth wheel platform coupling thereby coupling the tow vehicle and the trailer in roll.

17. The apparatus as defined in claim 12, the means to accommodate relative fore and aft movement of the trailer ends of the steering arms relative to the front axle assembly of the trailer including a transverse horizontal shaft parallel to the front axle assembly of the trailer, the transverse horizontal shaft having radial members to which the trailer ends of the steering arms are attached, the radial members pivoting about an axis represented by the transverse horizontal shaft in response to fore and aft movement of the trailer ends of the steering arms relative to the front axle assembly of the trailer.

18. The apparatus as defined in claim 12, the means to accommodate relative fore and aft movement of the trailer ends of the steering arms relative to the trailer including a front axle assembly pivotally mounted to a transverse pivot axis.

19. The apparatus as defined in claim 12, the trailer end of the drawbar assembly including a central drawbar mounted for omni-directional movement, a rigid support frame pivotally mounted on a substantially horizontal transverse axis thereby accommodating up and down movement and precluding side to side movement of the rigid support frame, and means for selectively locking the central drawbar to the support frame thereby precluding side to side movement of the central drawbar; and the steering arm assembly including a transverse support on the tow vehicle to which the tow vehicle ends of the steering arms are attached, the transverse support having multiple steering arm mounting positions whereby the spacing of the tow vehicle ends of the steering arms are adjusted relative to the single articulation point.

20. A trailer in combination with an apparatus for connecting the trailer to a tow vehicle, comprising:

a. a trailer having a front axle assembly which pivots about a vertical axis;

b. a drawbar assembly having a tow vehicle end adapted for mounting to a single articulation point at a rear of a tow vehicle and a trailer end pivotally mounted to a front of the trailer on a substantially horizontal transverse axis thereby accommodating up and down movement and precluding side to side movement of the drawbar assembly, the single articulation point being in the form of an omni-directional coupling; and c. a steering arm assembly including a pair of steering arms having tow vehicle ends adapted for omni-directional attachment to the tow vehicle equidistant from the single articulation point, and trailer ends omni-directionally attached to the front axle assembly of the trailer equidistant from the vertical pivot axis of the front axle assembly, thereby accommodating relative movement of the tow vehicle and the front axle assembly of the trailer while causing a proportionate change in the angular positioning of the front axle assembly of the trailer to maintain correct steering geometry of the trailer relative to the tow vehicle as the tow vehicle turns, the steering arm assembly including a transverse horizontal shaft parallel to the front axle assembly of the trailer, the transverse horizontal shaft having radial members to which the trailer ends of the steering arms are attached, the radial members pivoting about an axis represented by the transverse horizontal shaft in response to simultaneous fore movement and simultaneous aft movement of the trailer ends of the steering arms relative to the front axle assembly of the trailer.

21. A trailer in combination with an apparatus for connecting the trailer to a tow vehicle, comprising:
   a. a trailer having a front axle assembly which pivots about a vertical axis;
   b. a drawbar assembly having a tow vehicle end adapted for mounting to a single articulation point at a rear of a tow vehicle and a trailer end pivotally mounted to a front of the trailer on a substantially horizontal transverse axis thereby accommodating up and down movement and precluding side to side movement of the drawbar assembly, the single articulation point being in the form of a fifth wheel platform coupling thereby coupling the tow vehicle and the trailer in roll; and
   c. a steering arm assembly including a pair of steering arms having tow vehicle ends adapted for omni-directional attachment to the tow vehicle equidistant from the single articulation point, and trailer ends omni-directionally attached to the front axle assembly of the trailer equidistant from the vertical pivot axis of the front axle assembly, thereby accommodating relative movement of the tow vehicle and the front axle assembly of the trailer while causing a proportionate change in the angular positioning of the front axle assembly of the trailer to maintain correct steering geometry of the trailer relative to the tow vehicle as the tow vehicle turns, the steering arm assembly including a transverse horizontal shaft parallel to the front axle assembly of the trailer, the transverse horizontal shaft having radial members to which the trailer ends of the steering arms are attached, the radial members pivoting about an axis represented by the transverse horizontal shaft in response to simultaneous fore movement and simultaneous aft movement of the trailer ends of the steering arms relative to the front axle assembly of the trailer.

22. A trailer in combination with an apparatus for connecting the trailer to a tow vehicle, comprising:
   a. a trailer having a front axle assembly which pivots about a vertical axis;
   b. a drawbar assembly having a tow vehicle end adapted for mounting for omni-directional movement to a single articulation point at a rear of the tow vehicle, and a trailer end, the trailer end of the drawbar assembly including a central drawbar mounted for omni-directional movement, a rigid support frame pivotally mounted on a substantially horizontal transverse axis thereby accommodating up and down movement while precluding side to side movement of the rigid support frame, one of the central drawbar and the support frame having a male locking member, the other of the central drawbar and the support frame having a female locking member, the male locking member extending into the female locking member thereby selectively locking the central drawbar to the support frame to preclude side to side movement of the central drawbar; and
   c. a steering arm assembly including a transverse horizontal shaft mounted parallel to the front axle assembly of the trailer, the transverse horizontal shaft having radial members positioned equidistant from the vertical pivot axis of the front axle assembly, the steering arm assembly including a pair of steering arms having tow vehicle ends adapted for omni-directional attachment to the tow vehicle equidistant from the single articulation point, and trailer ends omni-directionally attached to the radial members of the transverse shaft thereby accommodating relative movement of the tow vehicle and the front axle assembly of the trailer while causing a proportionate change in the angular positioning of the front axle assembly of the trailer to maintain correct steering geometry of the trailer relative to the tow vehicle as the tow vehicle turns, the radial members pivoting about an axis represented by the transverse horizontal shaft in response to simultaneous fore movement and simultaneous aft movement of the trailer ends of the steering arms relative to the front axle assembly of the trailer, the steering arm assembly including a transverse horizontal support shaft on the tow vehicle to which the tow vehicle ends of the steering arms are attached, the tow vehicle ends of the steering arms being slidable along the transverse horizontal support shaft thereby providing a plurality of steering arm mounting positions whereby spacing of the tow vehicle ends of the steering arms are adjusted relative to the single articulation point, means being provided to lock the tow vehicle ends of the steering arms in preselected positions to the support shaft.

* * * * *